United States Patent [19]

Hellier et al.

[11] Patent Number: 5,634,280
[45] Date of Patent: Jun. 3, 1997

[54] MEASURING PROBE

[75] Inventors: Peter K. Hellier, Noth Nibley; Andrew J. Harding, Bristol, both of United Kingdom

[73] Assignee: Renishaw PLC, Gloucestershire, United Kingdom

[21] Appl. No.: 532,788
[22] PCT Filed: Feb. 17, 1995
[86] PCT No.: PCT/GB95/00343
    § 371 Date: Oct. 17, 1995
    § 102(e) Date: Oct. 17, 1995
[87] PCT Pub. No.: WO95/22739
    PCT Pub. Date: Aug. 24, 1995

[30] Foreign Application Priority Data

Feb. 18, 1994 [GB] United Kingdom ............ 9403130
Apr. 5, 1994 [GB] United Kingdom ............ 9406635
Apr. 16, 1994 [GB] United Kingdom ............ 9407592

[51] Int. Cl.⁶ .................. G01B 7/012; G01B 5/012
[52] U.S. Cl. .................. 33/559; 33/556; 33/572
[58] Field of Search .............. 33/559, 561, 556, 33/558, 572, 573

[56] References Cited

U.S. PATENT DOCUMENTS

| | | |
|---|---|---|
| 4,155,171 | 5/1979 | McMurtry . |
| 4,270,275 | 6/1981 | McMurtry . |
| 4,477,976 | 10/1984 | Suzuki . |
| 4,571,847 | 2/1986 | McMurtry ............ 33/561 |
| 4,763,417 | 8/1988 | Ernst . |
| 4,763,421 | 8/1988 | Feichtinger . |
| 4,897,929 | 2/1990 | Ernst et al. . |
| 5,299,361 | 4/1994 | Fiedler ............ 33/559 |
| 5,319,858 | 6/1994 | Coy ............ 33/561 |

FOREIGN PATENT DOCUMENTS

| | | |
|---|---|---|
| 0269789 | 6/1988 | European Pat. Off. . |
| 0269795 | 6/1988 | European Pat. Off. . |
| 0524341 | 1/1993 | European Pat. Off. . |
| 0551164 | 7/1993 | European Pat. Off. . |
| 2366541 | 4/1979 | France . |
| 1445977 | 8/1976 | United Kingdom . |

*Primary Examiner*—Christopher W. Fulton
*Attorney, Agent, or Firm*—Oliff & Berridge

[57] ABSTRACT

A measuring probe has a stylus carrier supported on a fixed member in a rest position when no force acts on the stylus, the stylus carrier being deflected from its rest position to produce a signal when an external force is applied to the stylus. The support for the stylus carrier comprises two concentric rings of ball bearings of different pitch circle diameters and arranged that each ball on one of the members contacts two adjacent balls on the other member. An additional annular surface is provided on one of the members and is contacted by each of the balls on the other member. The arrangement provides that the force required to deflect the stylus is substantially equal in all directions of the force, and that the movable member is properly guided during its deflection to the point where a signal is produced.

10 Claims, 5 Drawing Sheets

MEASURING PROBE

The present invention relates to measuring probes of the kind having a stylus attached to a stylus carrier which is supported in a rest position in a housing when no external force is acting on the stylus, and which is movable from the rest position when a force is applied to the stylus. Such force is applied to the stylus for example, when the probe is moved to bring the stylus into contact with a workpiece on a machine. The probe includes signalling means to provide a signal to the machine indicating that the stylus has been deflected by the workpiece. Such probes are known as touch trigger probes.

One example of such a probe is described in our U.K. Patent No. 1,445,977. It is a characteristic of the probe described in this patent that the force required to tilt the stylus from its rest position is not the same for all directions.

Attempts have been made to eliminate this characteristic, for example, as described in U.S. Pat. No. 4,477,976 (Kuroda) by mounting the stylus for pivoting on an annular surface surrounding the probe axis. However, because of the poor lateral constraint which is provided in this probe when the stylus is tilted from its rest position, detection of stylus deflection has to take place before the loss of accuracy due to sideways movement of the stylus holder becomes significant and affects the accuracy of the measurement.

Other examples of touch trigger probes which provide a more nearly uniform force to deflect the stylus are described in U.S. Pat. No. 4,763,421 (Heidenhain) and our U.S. Pat. No. 4,155,171.

In both of these designs the stylus support comprises a ring of ball bearing elements resting on a similar number of counterbearing elements.

One object of the present invention is to provide a support for the stylus of a touch trigger probe in which the force required to tilt the stylus from its rest position is substantially equal in all directions.

Another object of the present invention is to provide a support for the stylus of a touch trigger probe which provides lateral constraint for the stylus, once it is tilted from its rest position and until it reaches its signalling position.

According to the present invention a measuring probe comprises:

a fixed member, having an axis, a movable member to which a stylus is connectable, support means whereby the movable member is supported in a rest position on the fixed member, bias means for urging the movable member into the rest position on the fixed member, the movable member being deflectable from the rest position against the action of the bias means when an external force is applied to the stylus and being returnable to the rest position when the external force is removed, and signalling means for providing a signal when the movable member is deflected from the rest position, wherein the support means comprises, a ring of support elements on each of the fixed and movable members and concentric with said axis, the elements in at least one of the rings having curved surface portions, characterised in that the rings of elements are arranged so that curved surface portions of each element in one of the rings contact two adjacent elements in the other ring, and additional support surfaces are provided on one of the members which are contacted by curved surface portions of the elements on the other member.

The support elements may take any convenient form but in a preferred embodiment of the invention each ring of support elements comprises a ring of balls arranged so that each ball in a ring is confronted by and contacts two adjacent balls in the other ring.

The additional surfaces may be provided in any convenient form but in the preferred embodiment they are formed as parts of an annular surface.

In one preferred embodiment the rings of balls have sufficiently different pitch circle diameters that they rest substantially side-by-side within the probe when the stylus is in the rest position. The plane of the ring of balls on the movable member is slightly higher than the plane of the ring of balls on the fixed member. The annular surface is formed on the movable member and contacts the tops of the balls on the fixed member.

In another preferred embodiment, the pitch circle diameters of the two ball rings are only slightly different, and the planes of the two ball rings are axially spaced, so that the ball rings rest more nearly on top of one another. In this embodiment the additional annular surface is formed on the fixed member and is contacted by the balls on the movable member.

The signalling means may take any convenient form but in a preferred embodiment it comprises an electrical switch which is actuated after a predetermined deflection of the stylus. Also we have found that particulary good results are obtained when the switch is arranged to be actuated by two contacts coming into engagement rather than breaking engagement.

The invention will now be described in more detail, by way of example only, with reference to the accompanying drawings in which.

Referring now to FIGS. 1-4 of the drawings, there is shown a touch trigger probe having a housing 10 with a longitudinal axis 12. The housing 10 has at its lower end a radially extending flange 14 which defines an opening 16. The housing may be of any convenient shape and in this example has a cylindrical outer wall 11, and the flange 14 is fully circumferential so that the opening 16 is circular. A ring of balls 18 is glued into the housing such that each ball is in contact with a conical surface 20 formed on a region of the housing between the lower portion of the cylindrical outer wall 11 and the flange 14.

The balls 18 constitute support elements of one part of the support for a stylus 22 of the probe. The other part of the support is provided by support elements in the form of a second ring of balls 24, which is glued into a radially facing annular channel 26 on the periphery of a stylus carrier 28. A cylindrical part 30 of the stylus carrier extends out from the probe interior, and the stylus 22 is attached to the part 30, for example, by a screw-threaded joint 32. The stylus carrier 28 is movable relative to the fixed housing when a force is applied to the stylus to deflect it.

As can be seen the two rings of balls 18 and 24 are each concentric with the axis 12 and have slightly different pitch circle diameters, so that they rest side-by-side within the probe, with the centres of the balls substantially in the same plane and their curved surfaces in contact with each other. This arrangement as will be described later, provides good lateral constraint against movement of the stylus carrier 28 relative to the housing 10 in the horizontal plane.

The stylus carrier has a radially extending circumferential flange which overlies the ball ring 18, and which has an annular surface 34 which is in contact with each one of the balls in the ring to provide an axial constraint to the movement of the stylus carrier downwards. The annular surface, which is shown to be continuous although it need not be, therefore provides additional areas of surface in contact with the balls 18.

The combination of the various contacts between the individual balls in the ball rings, and between the balls and the different surfaces of the housing and the stylus carrier, provide a rest position for the stylus carrier relative to the housing when no external force is applied to the stylus. A spring 36 provides a biasing load which urges the stylus carrier into the rest position.

The stylus carrier is able to tilt in any direction and move axially upwards out of the rest position against the biasing load of the spring, when an external force is applied to the stylus, for example when the probe is moved to bring the stylus into contact with a workpiece on a machine.

In order to provide a signal when a force is applied to the stylus, a switch 40 is mounted within the housing which has a plunger 42 which is actuated either on tilting or lifting of the stylus carrier. As soon as the external force on the stylus is removed, however, the spring load urges the stylus carrier back towards its rest position, and the combination of the spring force and guidance provided by the surface of the balls in the ball rings ensures that the stylus carrier returns in a repeatable manner to the rest position.

Figure 2:
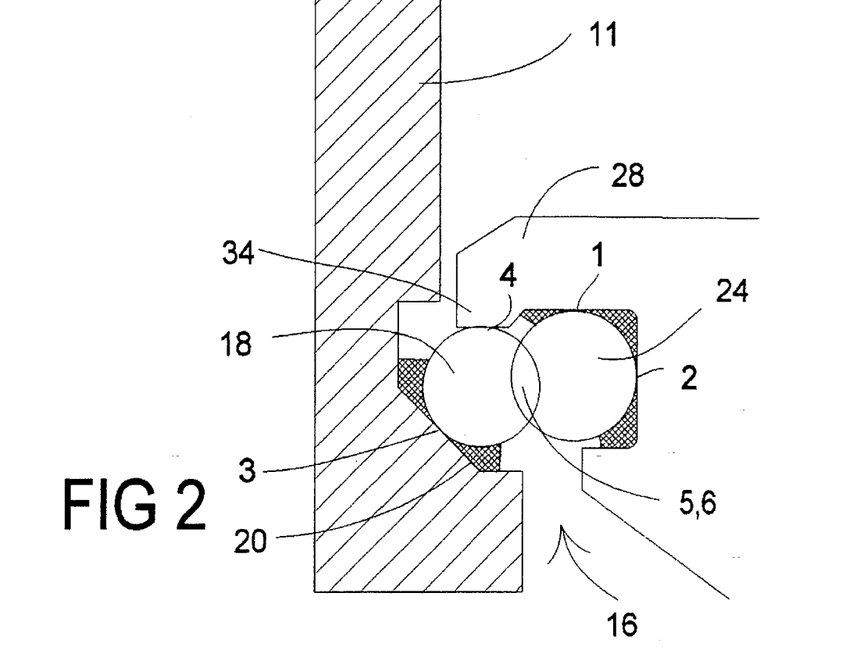
FIG. 2 is an enlarged view of part of the stylus support of FIG. 1.
Figure 3:
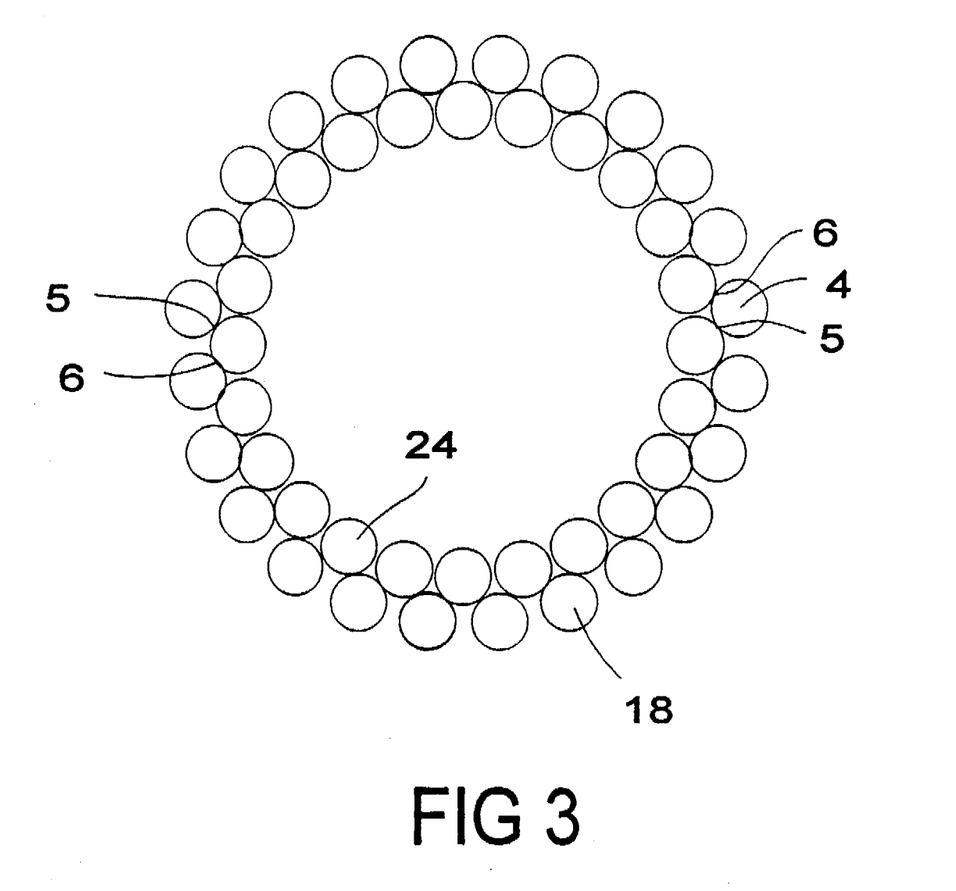
FIG. 3 is a plan view of the two ball rings of the stylus support.
Figure 4:
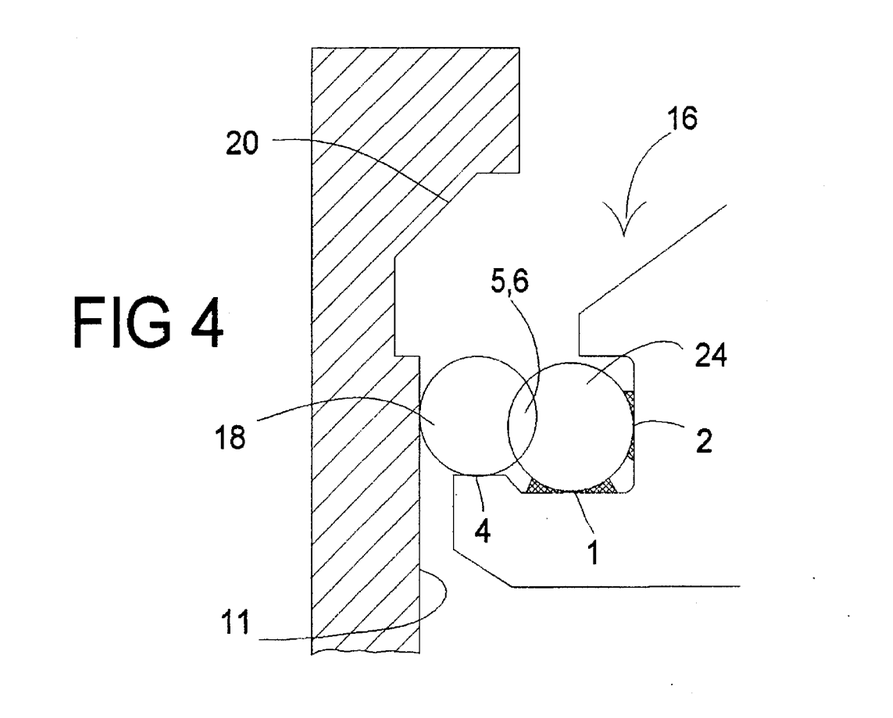
FIG. 4 is similar to FIG. 2 but inverted and illustrates the positions of the balls in the ball ring during assembly of the probe.

FIGS. 2 and 4 show in more detail, the locations of the contacts between the various surfaces of the balls and the fixed and movable members. The contacts are achieved as follows:

During assembly the balls 24 are placed in the annular channel 26 using a jigging device to produce an even spacing between the balls, and lightly tacked in place by glue so that they will not fall out but can still move under pressure when the other ring of balls is pressed into place. This part of the assembly process is preferably done with the stylus carrier inverted so that each ball rests under its own weight in contact at point 1 with the horizontal wall of the channel.

The casing 11 is then lowered over the stylus carrier and the second ring of balls 18 are pushed in through the opening 16 as shown in FIG. 4.

The last step is then to further lower the housing onto the stylus carrier. During this step, surface 20 will contact the balls 18, at point 3 urging them downwardly into firm contact with the annular surface 34 to provide good contact at point 4. Simultaneously the balls 18 will be urged radially into contact with balls 24 which in turn will move radially and circumferentially until firm contact is made by each ball 24 with the vertical wall of the channel 26 at point 2, and firm contact is made at the contact points 5 and 6 between the balls. When all these contacts have been firmly established no further relative movement between the stylus carrier and the housing will be possible in either the axial or radial directions. This establishes a rest position for the movable stylus carrier on the fixed housing.

While the balls are thus located further glue is injected to hold them in their contacting positions. Preferably the force used to urge the balls into contact with each other is arranged to be the same as the spring force which will be used in the probe when in operation, so that any movement of the balls due to resilience of the glue after release of the force during the assembly process will be reversed when the probe is completely assembled with its spring and all of the contacts will be re-established as they were under the assembly force.

This method of assembly produces a situation in which the stylus carrier is supported on the fixed structure in the rest position at a large number of contact points between the various bearing elements and between the bearing elements and the annular surface, and although overconstrained this rest position will tend to be repeatable.

When the stylus is deflected however, the stylus carrier will be tilted about one of the points 4 on the annular surface so that the centre of the stylus carrier against which the plunger 42 is resting will be lifted to generate a trigger signal. During this tilting the points 5 and 6 between the balls around the two rings will start to lose contact but two such points will remain in contact to provide a three point support guiding the movement of the stylus carrier. This results in a repeatable motion of the stylus carrier during its initial tilting up to the point at which the trigger signal occurs.

Figure 1:
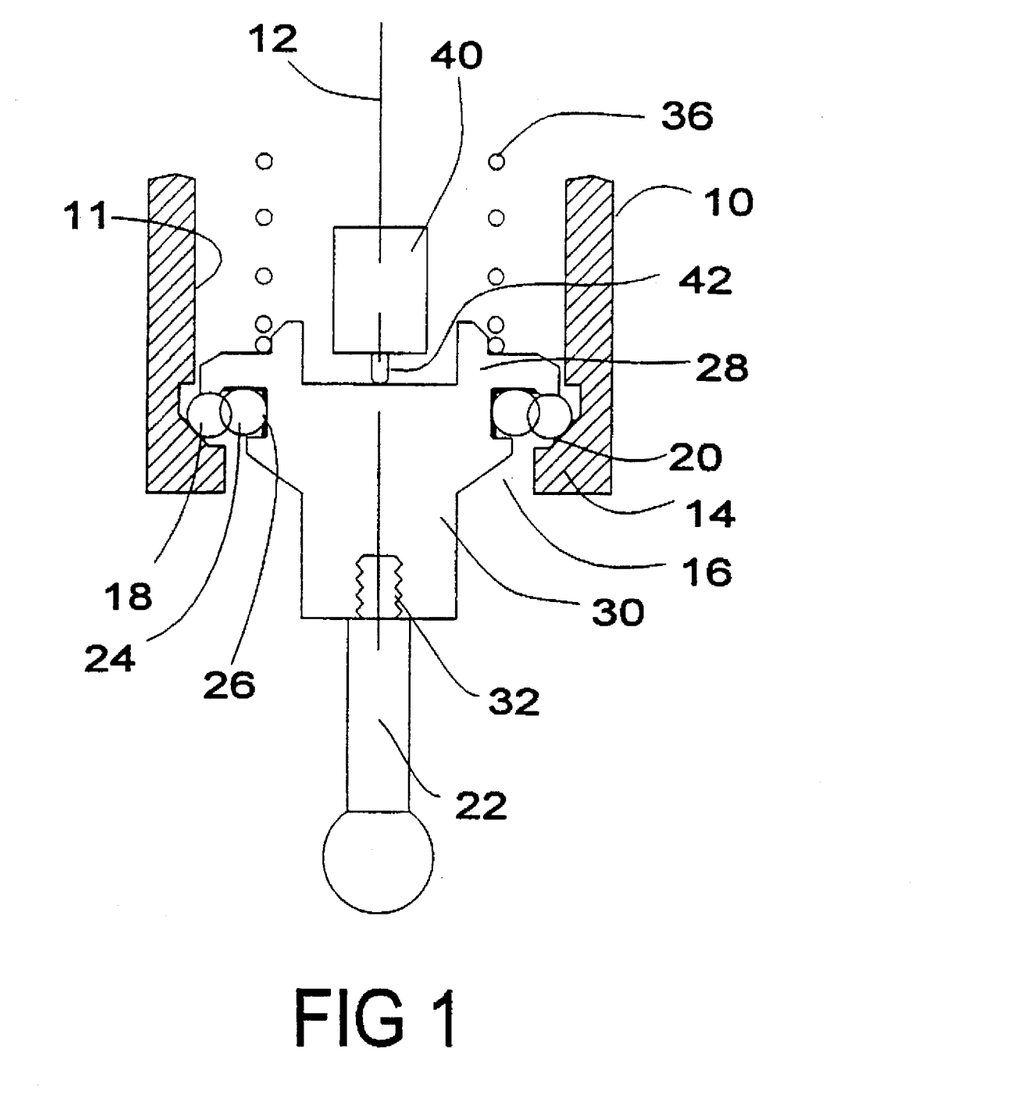
FIG. 1 is a part sectional elevation of a probe incorporating one form of stylus support according to the present invention.

Since the stylus carrier is guided during its initial tilting, the amount of tilting which can be allowed before a signal is generated by the switch (i.e. the pre-travel) can be sufficiently large to avoid false triggering due even to severe vibrations which may be encountered in a machine tool. Also, because the stylus carrier is located axially during manufacture by the contact of the annular flange with the tops of the balls 18 simultaneously with the contacts between the balls, the axial and radial position of the stylus carrier in the rest position is repeatable and pre-travel variation kept to a small value.

In order to minimise friction at the contacts between the balls, the dimensions of the balls, the channel 26, and the conical surface 20 are carefully calculated to ensure that the centres of the balls 24 lie on a plane slightly axially above the centres of the balls 18 when the stylus is in the rest position. This also ensures that during tilting there will be minimal sliding of the surfaces of the balls on one side of the probe as the stylus carrier pivots on the annular surface on the other side, and a clean lift off is assured.

As a further preferred feature, the tip of the plunger 42 of the switch is arranged to contact the stylus carrier at the plane of the balls, so that the plunger 42 is lifted vertically, with no sideways loading and wear is minimised.

The switch may be of any desired type, for example an LVDT, giving an analogue signal on which a threshold level is provided to give a trigger signal, or a mechanical switch, for example as made by Baumer AG in Switzerland.

Alternatively, other known signalling devices may be used to sense the tilting of the stylus carrier which could be optical, capacitive, or piezo-electric.

In the above-described embodiment each ring of balls includes twenty-two balls. However, the number of balls is not critical and can vary between a minimum of six and a maximum limited by the cost and size of the probe.

Figure 5:
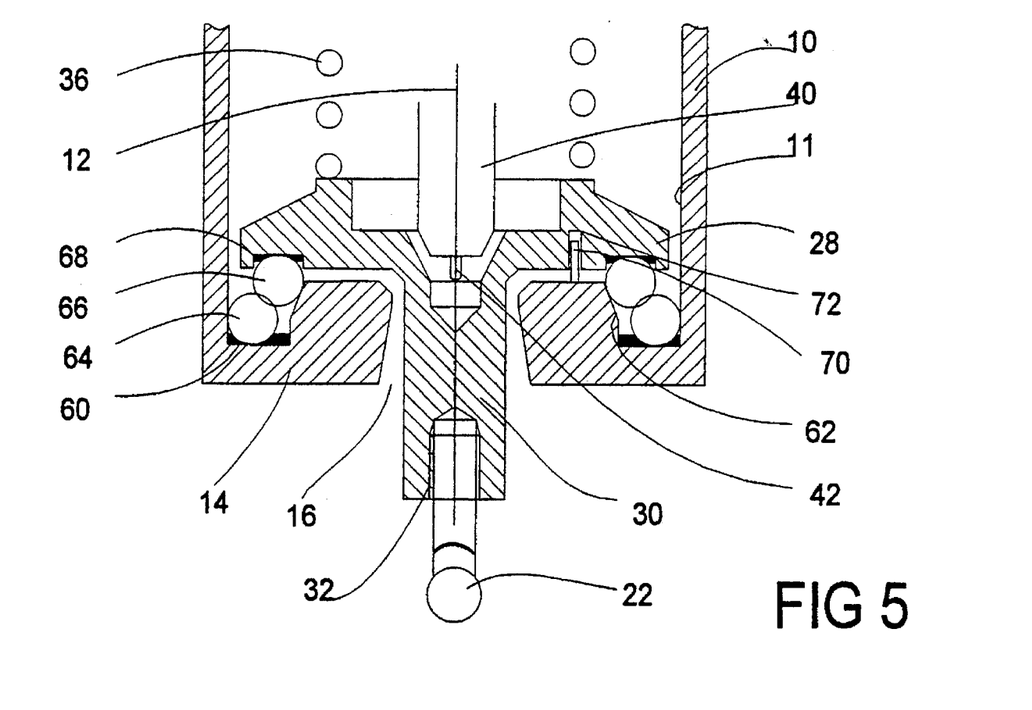
FIG. 5 is a part-sectional elevation of a probe incorporating another form of stylus support according to the present invention.
Figure 6:
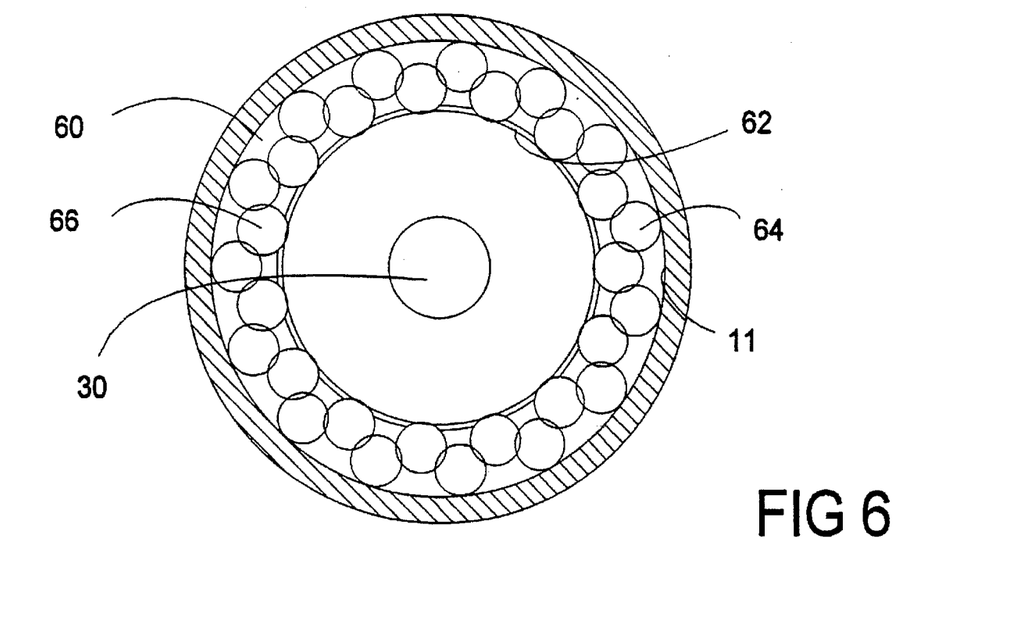
FIG. 6 is a plan view of the two ball rings of the probe support of FIG. 5.

Referring now to FIGS. 5 and 6 of the drawings, there is shown a touch trigger probe having many constructional details similar to those of the embodiment described above with reference to FIGS. 1–4. The same reference numerals are used to identify these features. The cylindrical housing 10 forming a fixed member has at its lower end a radially extending flange 14 which defines a circular opening 16 through which projects a stylus 22. The stylus is attached to a stylus carrier 28, which forms a movable member, as described above.

An axially upwardly-facing annular channel 60 is formed in the flange 14, one side of which is formed by the inner wall of the housing 10, and the other side of which includes an upwardly convergent frusto-conical wall section 62. A ring of balls 64 is glued into the channel 60 such that each ball is in contact with the bottom of the recess and with the inner wall of the housing.

The ring of balls 64 form the support elements of one part of the support for the stylus carrier 28 of the probe. The other part of the support is provided by support elements in the form of a second ring of balls 66, which are glued into an axially downwardly-facing annular channel 68 on the periphery of the stylus carrier 28.

As can be seen the two rings of balls 64 and 66 have slightly different pitch circle diameters, so that when the two ball rings are in contact, the planes of the ball rings are axially spaced. Each ball in each ring has two points of contact with adjacent balls in the other ring. The frusto-conical wall section 62 on the fixed housing provides additional surface areas in contact with the balls 66 on the movable stylus carrier.

The combination of the various contacts between the individual balls in the ball rings, and between the balls in the ring 66 and the frusto-conical surface 62 of the housing, provide a rest position for the stylus carrier relative to the housing when no external force is applied to the stylus. A spring 36 provides a biasing load which urges the stylus carrier into the rest position.

In the embodiment described, fifteen balls are provided on the stylus carrier 28 which provides fifteen support locations for the stylus carrier on the fixed structure of the housing. At each location radial constraint of the stylus carrier is provided, both radially inwardly and radially outwardly, by the contact of the balls 66 with the surface 62 and by the contact of the balls 66 with the balls 64. Such overconstraint of the stylus carrier could potentially lead to variations in the rest position of the stylus, and hence inaccuracies in the probe measurement.

These inaccuracies are minimised with the design of the present invention, which ensures that each of the balls 66 on the stylus carrier when in the rest position, is supported at only three points of contact with the support surfaces on the fixed structure i.e. the balls 64 and the surface 62.

This is achieved quite simply by the method of manufacture of the probe as described below:

During assembly the balls 64 are placed in the annular channel 60 and lightly tacked in place by glue, so that they will not fall out but can still move under pressure when the other ring of balls is pressed into place. This part of the assembly process locates the balls 64 so that each ball rests under its own weight in contact with the base of the channel and with the vertical wall 11, and by use of appropriate spacers the balls are evenly spaced around the axis.

The balls 66 may be lightly tacked in place in the channel 68 of the stylus carrier 28.

The last step is then to position the stylus carrier in the housing and insert a spring. During this step, the balls 66 will contact the balls 64, and the annular surface 62. Simultaneously the balls 64 will be urged radially into firm contact with the vertical wall 11 and downwardly into firm contact with the base of the channel 60. When no further axial or radial movement of the balls 64 is possible they will move circumferentially until firm contact is made by each ball 66 both with the frustoconical surface 62 and with each of the balls 64, at which time each ball 66 will have reached a stable position having three points of contact. When all these contacts have been firmly established no further relative movement between the stylus carrier and the housing will be possible in either the axial or radial directions.

While the balls are thus located further glue may be injected to hold them in their contacting positions. This part of the process is carried out in the manner described with reference to FIGS. 1–4.

It can be seen therefore that as in the previous embodiment the stylus carrier is completely restrained in the rest position from, axial movement in one direction, transverse movement in all directions, and from rotation about the axis 12, but is free to lift off balls 64 when an upward axial force is applied to the stylus 22, and is free to tilt about the two rings of balls 64,66 when a radial force is applied to the stylus. An anti-rotation pin 70 is provided on the flange 14 which fits into a recess 72 on the stylus carrier to ensure that after a deflection of the stylus from the rest position, each ball in the ring 66 will re-seat on the same pair of balls in the ring 64.

In order to provide a signal when a force is applied to the stylus, a switch 40 is mounted within the housing which has a plunger 42 which is actuated both on tilting or lifting of the stylus carrier.

The three point contact of each ball 66 on the movable member with the support surfaces defined by the curved surfaces of the balls 64, and the surface 62 on the fixed member, provide a fully defined pivoting centre for the stylus carrier 22 on one of the balls 66 during tilting of the stylus towards a switching position, when contact between the balls 66 and their respective support surfaces is lost at the other locations around the ring. As described with the previous embodiment, this allows repeatable guidance of the stylus carrier through an initial tilting angle to a position at which a trigger signal is obtained.

Once again the signalling means is illustrated as a Baumer type switch 40 but other types of signalling devices may be used.

Figure 7:
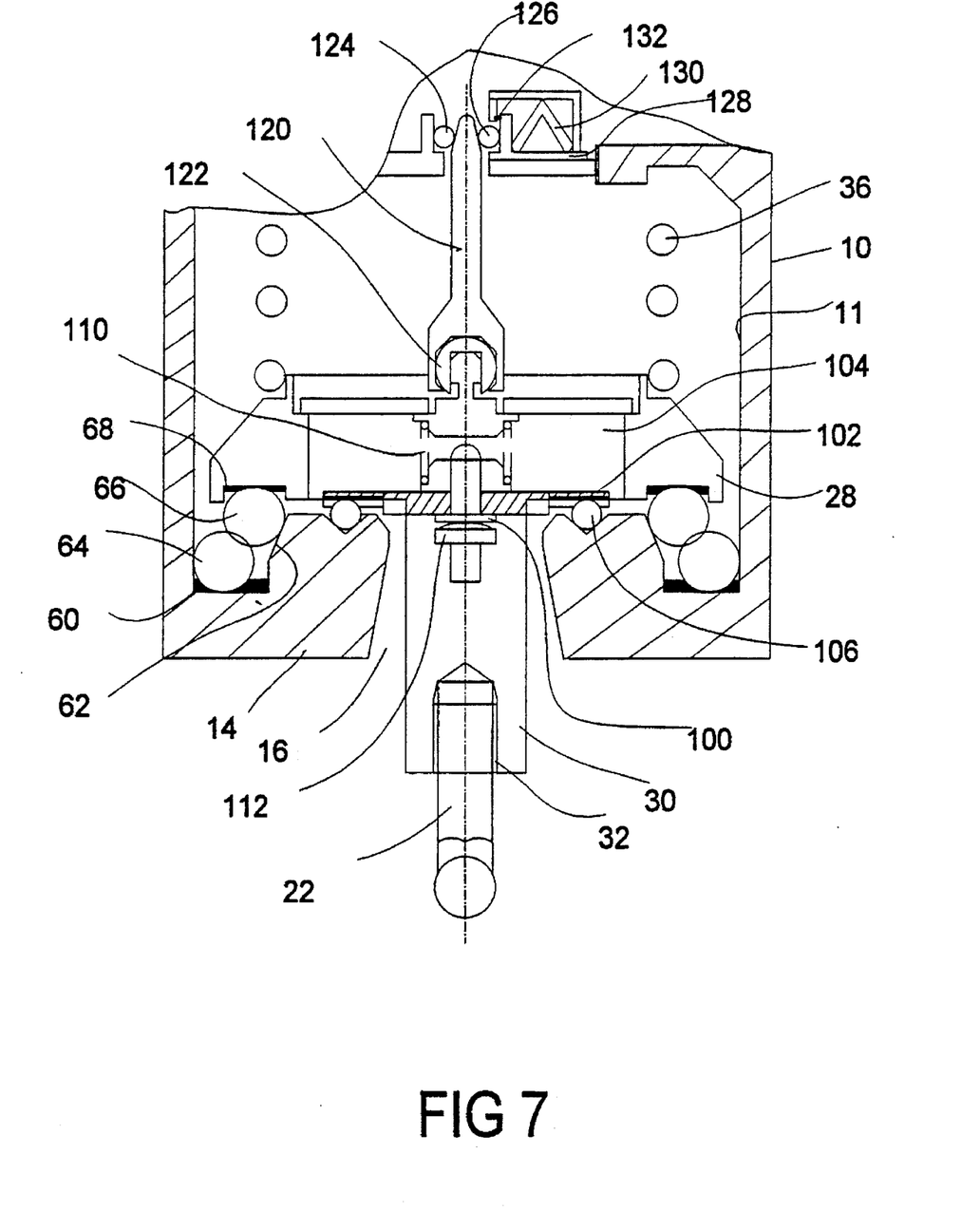
FIG. 7 is a part-sectional elevation of a modified version of the probe of FIG. 5 showing an alternative switching arrangement.

FIG. 7 illustrates another embodiment which employs a different signalling device. The main elements of the construction and method of manufacture are very similar to those described with reference to FIGS. 5 and 6. These elements are not described again in detail, but the same reference numerals are used to define similar features and reference should be made to FIGS. 5 and 6 for detailed description thereof.

In this embodiment a switch contact 100 is connected to a contact carrier 102 which is independently movable within a recess 104 inside the stylus carrier 28. The contact carrier is mounted to the fixed housing structure in a rest position defined by a traditional kinematic support consisting of three balls 106 equally spaced around the fixed structure and which are engaged by three grooves 108 on the contact carrier. A spring 110 biases the contact carrier downwards so that when the stylus 22 is in the rest position, the contact carrier will also be in its rest position.

Fixed to the cylindrical portion 30 of the stylus carrier 28 is a second switch contact 112 which, when the stylus is in its rest position, is spaced from the switch contact 100 by a very small gap e.g. 10 microns. The switch contacts are electrically isolated from the probe structure, and electrical connections are made to them in any convenient manner, e.g.

by wires within the probe body. The electrical connections form part of an electrical circuit connected to a power source, which may be a battery within the probe, or a power source on the machine to which the probe is connected.

When a force is applied to the stylus, the stylus carrier tilts or lifts from its rest position, but contact carrier 102 remains seated until the contact 112 comes into contact with the contact 100, and makes or completes the electrical circuit thus providing a trigger signal from the probe. Damage to the probe due to further movement of the stylus carrier is prevented by the contact carrier 102 lifting from its seat.

We have found that this switch, which operates on the principle of producing a signal when the contact is made between two electrical contacts, as opposed to breaking contact between them, provides a reliable signalling mechanism.

As an optional additional feature, a second, break switch is wired into the electrical circuit which provides a signal after a significant overtravel of the stylus beyond the first signalling position of the make switch. This allows the make switch to be set with a very small clearance for increased sensitivity, and provides a second signal which confirms that the make switch signal was produced by a genuine stylus deflection due to contact with a workpiece, and not simply due to vibration of the machine.

In this example, the second break switch is provided by a rod 120, which is pivotally mounted at one end on the stylus carrier 28, by means of a spherical bearing 122. The other end of the rod which is tapered, is supported between a pair of rollers 124,126, one of which 124 is fixed to the housing, the other of which 126 is carried by a slider 128 biased towards the rod by a spring 130. As the rod is lifted by the stylus carrier, the tapered end is pushed between the rollers, and the roller is urged sideways displacing the slider against the spring force to disengage a pair of contacts 132 disposed between the slider and the fixed structure of the housing.

Clearly the type of make switch described above could be used, with or without the additional break switch in any of the previously described embodiments.

We claim:

1. A measuring probe comprising:
   a fixed member (12), having an axis (12),
   a movable member (22) to which a stylus (22) is connectable,
   support means whereby the movable member is supported in a rest position on the fixed member,
   bias means for urging the movable member into the rest position on the fixed member, the movable member being deflectable from the rest position against the action of the bias means when an external force is applied to the stylus and being returnable to the rest position when the external force is removed, and
   signalling means for providing a signal when the movable member is deflected from the rest position,
   wherein the support means comprises, a ring of support elements on each of the fixed and movable members and concentric with said axis, the elements in at least one of the rings having curved surface portions,
   characterised in that the rings of elements are arranged so that curved surface portions of each element in one of the rings contact two adjacent elements in the other ring, and additional support surfaces are provided on one of the members which are contacted by curved surface portions of the elements on the other member.

2. A measuring probe according to claim 1 characterised in that both rings of support elements have curved surface portions.

3. A measuring probe according to claim 2 characterised in that both rings of support elements comprise ball bearing elements.

4. A measuring probe according to claim 1 characterised in that the additional support surfaces are formed as portions of an annular surface.

5. A measuring probe according to claim 1 characterised in that the additional support surfaces are formed on the movable member.

6. A measuring probe according to claim 1 characterised in that the additional surfaces are formed on the fixed member.

7. A measuring probe according to claim 5 characterised in that the two rings of support elements have sufficiently different pitch circle diameters such that they lie substantially side-by-side within the probe when the movable member is in the rest position, and annular surface on the movable member faces axially towards an opening to rest on the curved surfaces of the support elements on the fixed member.

8. A measuring probe according to claim 6 characterised in that the two rings of support elements have only slightly different pitch circle diameters, and an annular surface on the fixed member is frusto-conical, converging axially away from an opening, so that when the movable member is in the rest position, the planes of the two rings of support elements are axially spaced with the curved surfaces of respective support elements in each ring in contact with each other, and with the curved surfaces of the elements on the movable member additionally in contact with the annular surface (62).

9. A measuring probe according to claim 1 characterised in that the signalling means is an electrical switch.

10. A measuring probe according to claim 9 characterised in that the electrical switch comprises a pair of electrical contacts which are spaced apart when the movable member is in the rest position, and which are moved into contact with one another when the movable member is deflected to complete an electrical circuit and produce a signal.

* * * * *

UNITED STATES PATENT AND TRADEMARK OFFICE
CERTIFICATE OF CORRECTION

PATENT NO.   : 5,634,280
DATED        : June 3, 1997
INVENTOR(S)  : Peter K. HELLIER et al.

It is certified that error appears in the above-indentified patent and that said Letters Patent is hereby corrected as shown below:

Column 7, in claim 1, line 42, delete "(12)" (both occurrences);
                     line 43, delete "(22)" (both occurrences).

Signed and Sealed this

Ninth Day of December, 1997

Attest:

BRUCE LEHMAN

Attesting Officer

Commissioner of Patents and Trademarks